3,778,404
HOT MELT COATING COMPOSITION
AND METHOD
Robert N. Henkel, Arthur, Ill., and John H. Kruschinski, Fairfield, Ohio, assignors to National Distillers and Chemical Corporation, New York, N.Y.
No Drawing. Filed June 19, 1970, Ser. No. 47,888
Int. Cl. C08f 45/34
U.S. Cl. 260—33.2 R    6 Claims

ABSTRACT OF THE DISCLOSURE

Hot melt extrusion of coatings based on polyethylene or copolymers of ethylene and vinyl acetate, containing as chill roll release agents very small quantities of polyethylene glycol.

BACKGROUND OF THE INVENTION

Paperboard and other substrates are often coated with films of polyethylene, or copolymers of ethylene with vinyl acetate, to produce waterproof materials from which cartons or various film wrappers can be made, with the polymer films acting as heat-sealing agents. Paperboard coated with polyethylene coatings is used extensively in the production of milk cartons, for example, whereas cellophane film coated with ethylene-vinyl acetate copolymers is useful for cheese wrap.

In usual practice, the board or other substrate is coated by extruding a molten film of the polymer through a die onto a moving web of the board; the web is passed between a pressure roll and a chill roll which acts to smooth and polish the film. The web leaving the chill roll may thereafter be subjected to a corona discharge, or to some other treatment to make the surface printable or otherwise modify the surface characteristics thereof.

A limiting factor on the speed with which such an operation may be carried out is the tendency of the coating to adhere to the chill roll; it is necessary that the force needed to overcome this adhesive tendency be less than the cohesive power of the film, or the strength of the paper. It is obvious that any decrease in the adhesive tendency will enable coating speeds to be increased, with resultant economies.

The obvious answer is a lubricant additive, and it has in fact been attempted to incorporate such materials in ethylene polymer coatings. However, the amounts of additive which can be used are limited by the fact that the same lubricant properties which reduce adhesion to the chill roll also interfere with printing ink adherence and heat-sealing.

It is, therefore, a principal object of the present invention to provide a hot melt coating composition incorporating a chill roll release additive, and a method employing the same which may be utilized at high coating line speeds without substantial chill roll adhesion and which, at the concentrations which are so useful, does not substantially impair printing ink adherence to, and heat-sealing of, the polymer-coated substrate.

STATEMENT OF THE INVENTION

We have discovered that much improved chill roll release characteristics can be imparted to films prepared by the extrusion coating of paperboard or other substrates with hot melts of polyethylene or copolymers of ethylene with minor quantities of vinyl acetate, by the addition to the coating composition of very small quantities of a polyethylene glycol having an average molecular weight of at least about 400, and preferably between about 600 and 4000. While it has previously been suggested to incorporate polyethylene glycols, alone or in admixture with other materials in polyethylene compositions to improve the antistatic characteristics thereof (see, for example, U.S. Patents Nos. 2,879,244; 3,222,314; 3,223,664; and 3,354,138), it has not previously been suggested to utilize polyethylene glycol, in the proportions set forth hereinafter, as a chill roll release additive for polyethylene and ethylene-vinyl acetate copolymer coatings. Most surprisingly, we have found that this additive, unlike other materials previously utilized to improve the antistatic characteristics of ethylene polymers imparts superior chill roll release characteristics thereto which facilitate the use of markedly increased coating line speeds without, however, simultaneously impairing the printability or heat-sealability of the coated film.

In the case of coating compositions consisting essentially of ethylene homopolymers, we have found that the chill roll release additive hereof may suitably be admixed with non-linear, low density polyethylene resins having densities of from about 0.915 up to as high as 0.950, preferably from about 0.915 to 0.925, in amounts of only from about 400 to 1200 parts of the polyethylene glycol per million parts by weight of the resin (which proportion is hereinafter designated, as a matter of convenience, by the abbreviation "p.p.m."). Such compositions, notwithstanding the small amounts of additive incorporated therein, nevertheless exhibit chill roll release characteristics such that substantially higher coating line speeds may be obtained than were heretofore possible. Moreover, we have found that the small amounts of polyethylene glycol additive thus utilized do not impair the ink adhesion or heat-seal characteristics of the polyethylene coatings incorporating the same.

It has further been determined that the amount of the polyethylene glycol incorporated in the polyethylene coating compositions of this invention varies inversely, with the indicated range, with the density of the ethylene homopolymer admixed therewith. Thus, only from about 500 to 600 p.p.m. of the polyethylene glycol need be admixed with polyethylenes having a density of about 0.924, whereas it is desirable to employ from about 900 to about 1200 p.p.m. of such additive in those compositions incorporating polyethylenes having a density of about 0.915. The proportions of the chill roll release additive incorporated in the ethylene homopolymer coatings of this invention are thus related to the density of the homogeneous polymer coating.

On the other hand, in the case of the ethylenevinyl acetate copolymer coatings hereof it does not appear that the proportion of the polyethylene glycol additive is related to the varying densities of the heterogeneous coating composition. Ethylene-vinyl acetate copolymers useful in the coating compositions and method of this invention may incorporate up to about 30% by weight, and preferably from about 15% to 30%, of vinyl acetate, and may have melt indexes of above about 1, preferably from about 7 to 40. The addition of any suitable amount within the range of from about 400 to 2000 p.p.m. of the polyethylene glycol chill roll release additive to such copolymers have been found sufficient to produce the improved results of this invention.

In either the polyethylene or ethylene-vinyl acetate copolymer coatings hereof it is, however, essential, in order to achieve the objects of the present invention, to incorporate the polyethylene glycol chill roll release additive in amounts within the ranges of proportions described above. The use of less than about 400 p.p.m. of the polyethylene glycol has been found insufficient to markedly improve the chill roll release characteristics of the coating compositions. On the other hand, while the use of more than about 1200 p.p.m. of the additive in the polyethylene coatings, or more than about 2000 p.p.m. of the additive in the case of the ethylene-vinyl acetate copolymer coatings, improves the chill roll release characteristics thereof, at the same time it substantially degrades the heat-sealing and printing ink adhesion properties of the coatings and may otherwise adversely affect the coating operation.

The polyethylene glycol additive may be dry-blended with the ethylene polymer resin or otherwise admixed therewith, as by melting the ingredients together, or compounding the same in a Banbury mixer, two-roll mill or the like. The resulting coating composition is extruded in molten form onto a suitable substrate which may be paper, paperboard, cellophane, polypropylene or other polymeric film, or the like. In this connection the polyethylene coating compositions are frequently employed, as indicated hereinabove, for forming heat-sealable coatings on paperboard for milk cartons, whereas the ethylene-vinyl acetate copolymer coatings are particularly suitable, because of their low heat-sealing temperatures, clarity and toughness, on cellophane or the like for cheese or similar food wraps.

The melt temperature may vary somewhat, typically being about 600° F., the polymer melt being extruded onto the substrate at line speeds of the order of from 600–1000 feet or higher per minute. The ethylene polymer coatings thus formed may be extruded on the substrate in any desired thickness, coating thicknesses from as low as about 0.25 mil up to about 10 mils being possible. The presence of the chill roll release additive in the coating composition is, in fact, believed to facilitate better drawdown of the extruded coating, thus facilitating the formation of extremely thin coatings.

The thus coated web is fed between a pressure roll and a highly polished chill roll, which latter acts to smooth and polish the surface of the coating; it is adhesion of the polymer coating to the latter roll which is one of the factors limiting the maximum coating line speed and to which the present invention is directed. The coated web is thereafter cooled and may, if desired, be treated by corona discharge or otherwise to improve the printability or otherwise modify the surface characteristics thereof.

It is believed that the polyethylene glycol chill release additive is incompatible with the ethylene polymer with which it is admixed and forms a very thin film at the polymer surface, tending to decrease adhesion of the coating to the chill roll. Moreover, the waxy nature of the glycol is believed to internally lubricate the polymer coating, thus accounting for the improved draw-down characteristics observed in connection with the coating compositions of the invention and referred to hereinabove. It should, of course, be understood that the present invention should not be construed as limited to this proposed mechanism.

PREFERRED EMBODIMENTS OF THE INVENTION

The ethylene homopolymers which may be used in the coating composition of this invention may be non-linear polyethylenes having, as noted hereinabove, densities varying from as low as about 0.915 to as high as about 0.950. Homopolymers so useful comprise those conventionally prepared by the polymerization of ethylene at high pressures in the presence of organic peroxides or other free radical-forming catalysts. Commercially available polyethylenes so useful include the various coating grades of Petrothene polyethylene resins available from the U.S. Industrial Chemicals Co. Division of the assignee of this invention.

Alternatively, when the coating composition incorporates an ethylene-vinyl acetate copolymer, it is convenient to use such materials incorporating from 15%–30% by weight vinyl acetate for such purpose. Commercial ethylene-vinyl acetate resins which may be so utilized include the various coating grades of Ultrathene ethylene-vinyl acetate copolymer resins available from the aforesaid U.S. Industrial Chemicals Co. Such ethylene-vinyl acetate copolymers may be prepared, for example, by the process described in copending application Ser. No. 775,902, filed on Nov. 14, 1968, now abandoned, and owned by the assignee of this invention.

The polyethylene glycol chill roll release additive incorporated in small amounts in the ethylene polymer coating compositions hereof is a relatively long chain glycol, or diol, containing the repeating oxyethylene group ($OC_2H_4$) and having hydroxyl groups attached to the terminal carbon atoms of the oxyethylene chain. Such polyethylene glycols may be prepared by reaction of ethylene oxide with water, ethylene glycol, or a lower polyethylene glycol, e.g., diethylene glycol or triethylene glycol, in the presence of an alkaline catalyst, the degree of polymerization being controlled to form a product having the desired molecular weight. As previously noted, polyethylene glycols useful in the practice of this invention comprise those having an average molecular weight in excess of about 400, and preferably from about 600–4000. Polyethylene glycols which may be so employed include those commercially available as "P.E.G." or "Carbowax" products.

The preparation and use of coating compositions incorporating the above materials in accordance with this invention is illustrated in the following examples:

EXAMPLES 1–3

Extrusion coating with polyethylene homopolymers incorporating polyethylene glycol chill roll release agents A non-linear, low density polyethylene coating resin having a density of 0.924 (commercially available as petrothene NA–205) was blended with varying proportions of the polyethylene glycols identified in the following table to formulate the coating compositions of Examples 1–3. For control purposes, coating compositions were similarly formulated in the absence of any chill roll release additive and in the presence of varying proportions of behenylamide, a long chain amide previously proposed as an antistatic additive for polyethylene compositions, providing control coatings A–E, inclusive.

TABLE 1.—COMPOSITIONS OF TEST AND CONTROL COATINGS

| Chill roll release additive | Average M.W. of additive | Nominal proportion of additive, p.p.m. |
|---|---|---|
| Example: | | |
| 1 ......... Polethylene glycol ............. | 600 | 500 |
| 2 ............... do ................... | 600 | 1,000 |
| 3 ............... do ................... | 4,000 | 500 |
| Control: | | |
| A ........................................... | | |
| B ......... Behenylamide ..................... | | 300 |
| C ............... do ........................ | | 500 |
| D ............... do ........................ | | 700 |
| E ............... do ........................ | | 1,125 |

The above blends were hot melt-coated on a bleached paperboard substrate on a Beloit extrusion coater. The various coatings were deposited employing a melt temperature of approximately 600° F. and a web line speed of 800 feet per minute. The coated boards were passed over a mirror finish chill roll (approximately 1 microinch RMS). They were thereafter subjected to corona discharge treatment with a 6A Lepel treater to improve ink adhesion thereto.

The chill roll release characteristics of the respective coatings were evaluated by determining Kidder tension readings and sound ratings during the coating operation. The Kidder tension reading indicates the tension in pounds required to strip the coated substrate from the chill roll, and is measured by reducing the winder tension until the substrate begins to climb up the chill roll surface. The coated films having lower tension readings exhibited better chill roll release.

The sound ratings were qualitatively determined by the machine operators, based upon the sound (noise) level during operation. Higher sound ratings are due to sounds produced by stripping the adhesive coating from the substrate, and thus indicate poorer chill roll release.

The Kiddler tension readings and sound ratings of various of the test and control coatings produced as described above appear in Table II below:

TABLE II.—CHILL ROLL RELEASE CHARACTERISTICS OF TEST AND CONTROL COATINGS

|  | Kidder tension reading (lbs.) | Sound rating [1] |
|---|---|---|
| Example: | | |
| 1 | 200 | 1 |
| 2 | 200 | 1 |
| Control: | | |
| A | 220 | 3 |
| C | 210 | 2 |

[1] Number 1 rating represents the least sound, indicating the best chill roll release; number 3 rating, on the other hand, represents the most sound, indicating the poorest release.

Following the corona discharge treatment, the retention of the wettability characteristics imparted to the web coating was measured, employing the Visking Wetting Tension Test (ASTM D 2578–67). The wetting tension values for the respective test and control coatings are given in Table III below, immediately after extrusion of the coatings and for periods 24 hours and two weeks thereafter:

TABLE III.—RETENTION OF SURFACE TREATMENT OF TEST AND CONTROL COATINGS

| | Visking wetting tension (dynes/cm.) [1] | | |
|---|---|---|---|
| | Off machine | 24 hours | 2 weeks |
| Example: | | | |
| 1 | 42 | 42 | 39 |
| 2 | 42 | 42 | 39 |
| 3 | 41 | 41 | 40 |
| Control: | | | |
| A | 43 | 41 | 38 |
| B | 43 | 41 | 39 |
| C | 43 | 41 | 38 |
| D | 43 | 39 | 39 |
| E | 34 | 35 | 35 |

[1] The higher the value the better the surface treatment level. A level of 37 is considered satisfactory for ink adhesion while 39 is necessary for glue sealing.

From the preceding tabulations it will be evident that the polyethylene glycol-containing polyethylene coatings of Examples 1–3 exhibited superior chill roll release characteristics, without impairment of the wettability characteristics of the coated films, as compared with the various control coatings A through E.

EXAMPLES 4–6

Extrusion coating with ethylene-vinyl acetate copolymers incorporating polyethylene glycol chill roll release additives An ethylene-vinyl acetate copolymer resin having a nominal composition of 82% ethylene-18% vinyl acetate, a density of 0.941 and a melt index of 20 (commercially available as Ultrathene UE–633) was blended with varying proportions of the polyethylene glycols identified in Table IV below to formulate the coating compositions of Examples 4–6. For control purposes coating compositions were similarly formulated in the absence of any chill roll release additive (Control F) and in the presence of 1750 p.p.m. of behenylamide (Control G). The ethylene-vinyl acetate incorporated in the coating of Control G had a nominal composition of 77% ethylene, 23% vinyl acetate, a density of 0.944 and a melt index of 27. The compositions were as follows:

TABLE IV

| Chill roll release additive | | Average M.W. of additive | Nominal proportion of additive, p.p.m. | Coating weight (lbs./ 3,000 sq. ft.) |
|---|---|---|---|---|
| Example: | | | | |
| 4 | Polyethylene glycol | 600 | 500 | 27.0 |
| 5 | do | 600 | 1,000 | 27.6 |
| 6 | do | 600 | 2,000 | 28.8 |
| Control: | | | | |
| F | | | | 24.7 |
| G | Behenylamide | | 1,750 | 27.0 |

The chill roll release characteristics of the coating compositions identified in Table IV were evaluated by determining the Kidder tension readings during the extrusion coating operation in the manner described above in connection with Examples 1–3. The tension readings thus determined were as follows:

TABLE V

| Example: | Kidder tension (reading [lbs.]) |
|---|---|
| 4 | 230 |
| 5 | 120 |
| 6 | 120 |
| Control: | |
| F | 250 |
| G | 190 * |

*Increased smoke was produced from the polymer melt and poorer adhesion and low temperature heat-seal characteristics were observed, as compared with the coatings of Examples 4, 5 and 6, respectively.

From the preceding tabulation it will be evident that the polyethylene glycol-containing ethylene-vinyl acetate copolymer coatings of Examples 4–6 exhibited markedly superior chill roll release characteristics, compared with control coatings F and G.

It will be understood that various changes may be made in the embodiments of the method and composition for imparting improved chill roll release characteristics to ethylene polymer coatings, without departing from the scope of this invention. Accordingly, the invention should solely be construed in the light of the claims appended hereto.

We claim:

1. A hot melt coating composition mixture of a copolymer of ethylene with 15–30% of vinyl acetate and a polyethylene glycol chill roll release agent, the polyethylene glycol having an average molecular weight of 400–4000 and being admixed with the ethylene-vinyl acetate copolymer in an amount of 400–2000 p.p.m. of said copolymer.

2. The composition of claim 1, in which the polyethylene glycol has an average molecular weight of from 600–4000.

3. The hot melt coating composition mixture of an ethylene-vinyl acetate copolymer having a melt index in excess of 1 and 15–30 weight percent vinyl acetate and a polyethylene glycol chill release agent in an amount of from 400–2000 p.p.m. of said copolymer, and said polyethylene glycol having an average molecular weight of 400–4000.

4. The hot melt coating composition of claim 3, in which the polyethylene glycol admixed has an average molecular weight of from 600–4000.

5. The hot melt coating composition of claim 4 in which the polyethylene glycol has an average molecular weight of about 600 and said copolymer has a melt index of about 7 to 40.

6. A hot melt coating composition mixture of a copolymer of ethylene with 15%–30% of vinyl acetate and a polyethylene glycol chill roll release agent, the polyethylene glycol having an average molecular weight of about 600 and being admixed with the ethylene-vinyl acetate copolymer in an amount of 400–2000 p.p.m. of said copolymer.

References Cited

UNITED STATES PATENTS 3,496,124   2/1970   Needham et al. __ 260—33.2 RX
3,222,314  12/1965   Wolinski _____ 260—33.2 R LEWIS T. JACOBS, Primary Examiner